Sept. 23, 1924.

G. A. KNILANS

AUTOMATIC HOG FEEDER

Filed Feb. 28, 1924

1,509,433

Inventor
George A. Knilans
By H. E. Bryant
Attorney

Patented Sept. 23, 1924.

1,509,433

UNITED STATES PATENT OFFICE.

GEORGE A. KNILANS, OF FORT ATKINSON, WISCONSIN.

AUTOMATIC HOG FEEDER.

Application filed February 28, 1924. Serial No. 695,730.

*To all whom it may concern:*

Be it known that I, GEORGE A. KNILANS, a citizen of the United States of America, residing at Fort Atkinson, in the county of Jefferson and State of Wisconsin, have invented certain new and useful Improvements in Automatic Hog Feeders, of which the following is a specification.

This invention relates to new and useful improvements in automatic hog feeders.

An important object of the invention is to provide a feeder for hogs which will prevent the latter from wallowing in the feed.

A further object of the invention is to provide automatic means, controlled by the hogs while feeding, for controlling the passage of feed from the supply hopper to the feeding trough.

A still further object of the invention is to provide means for regulating the amount of feed automatically discharged into the feeding trough.

Other objects and advantages of the invention will be apparent during the course of the following description.

Figure 1:
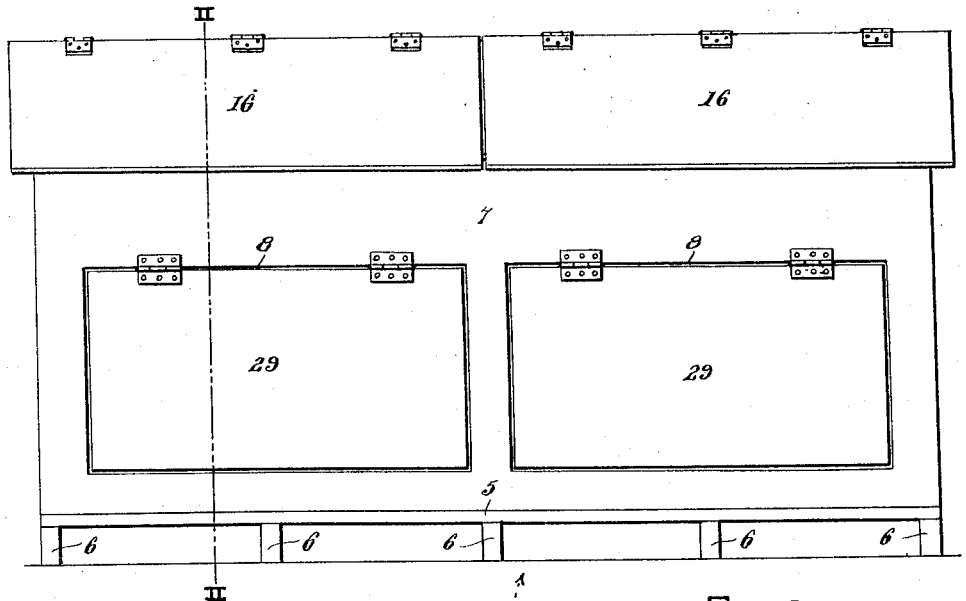
Figures 2, 3:
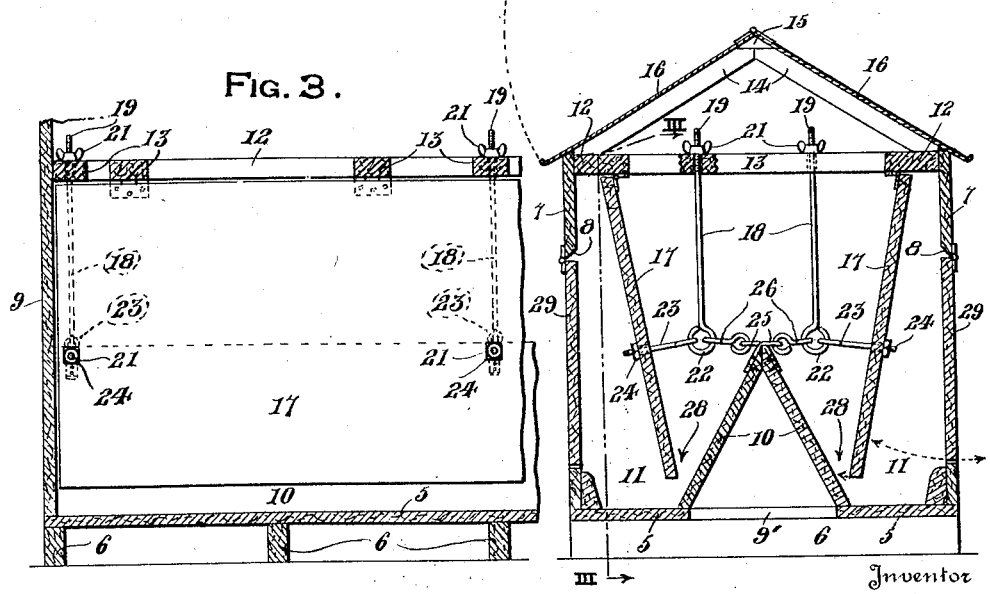

In the accompanying drawing forming a part of this specification and in which like numerals are employed to designate like parts throughout the same, Figure 1 is a side elevational view of the automatic hog feeder embodying this invention, Figure 2 is a vertical sectional view taken upon line II—II of Fig. 1, and Figure 3 is a fragmentary longitudinal sectional view taken upon line III—III of Fig. 2.

In the drawing, wherein for the purpose of illustration is shown a preferred embodiment of this invention, the numeral 5 designates the floor of the feeder which is illustrated as being mounted upon the plurality of legs 6 for supporting the same above the ground. The feeder further embodies side walls 7 having doorway openings 8 formed therein and end walls 9. In Fig. 2, the floor 5 is illustrated as being provided with a central, longitudinally extending opening 9' which is closed by the longitudinally extending V-shaped partition 10 which divides the said feeder into two longitudinally extending feed troughs 11.

Longitudinally extending rafters 12 are secured at their opposite ends to the end walls 9 of the feeder and are positioned with their outer longitudinal edges flushly engaging the upper edges of the side walls 7. Extending transversely of the feeder and connected at their opposite ends to the inner longitudinal edges of the rafters 12 are a series of rafters 13, as illustrated. The top of the feeder is of the gable roof type and consists of transversely extending inverted V-shaped supporting beams 14, best illustrated in Fig. 2. Suitably connected to the peaks of these inverted V-shaped supporting beams 14 is a ridge pole 15 to which the covers 16 are hingedly connected. In Fig. 2, there is a dotted arrow line indicating the direction in which one of these covers 16 travels for permitting feed to be deposited in the feeder.

Hingedly connected to the longitudinally extending rafters 12 are the depending feed controlling boards 17 which extend longitudinally of the feeder. Depending from some of the series of transversely extending rafters 13 are the rods 18 which are provided with threaded upper ends 19 and are longitudinally adjustably connected to said rafters 13 by the wing nuts 21 which are threaded upon the ends 19. The lower ends of these rods 18 are bent to form eyes 22, as best illustrated in Fig. 2. The feed controlling boards 17 are provided with eye bolts 23 having the eye portions positioned inwardly of the boards and having adjusting nuts 24 threaded to the outer ends of the said bolts. The apex of the longitudinally extending inverted V-shaped partition 10 is provided with straps 25 having eyes formed in the laterally projecting end portions which carry the chain links 26. It will be seen by inspecting Fig. 2 that the eyes 22 formed in the lower ends of the depending rods 18 are connected to the eyes of the bolts 23 and to the free eyes of the chain links 26. It will be seen by this arrangement that the feed controlling boards 17, with the end walls 9 of the feeder, will form a longitudinally extending hopper. The lower longitudinal edges of the feed controlling boards 17 are illustrated as being spaced from the outer faces of the inverted V-shaped partition 10. These spaces 28 will permit the feed to be discharged gradually into the feeding troughs 11. It will be noted that the nuts 24 on the eye bolts 23 may be operated for varying the gaps 28, also, the wing nuts 21 may be operated upon the rods 18 for raising and lowering the eye portions 22 formed on the said rod. This adjustment of the rods 18 will permit the lower longitudinal edges of the feed controlling boards 17 to be adjusted in respect to the inverted V-shaped partition 10 for increasing or decreasing the gaps 28.

In Figs. 1 and 2, the door openings 8 formed in the side walls 7 are illustrated as being closed by the swinging doors 29. Figure 2 illustrates by a dotted arrow line the direction of movement of the swinging doors 29.

The operation of the automatic feeder is as follows:—

The owner of the feeder may place the desired feed within the longitudinally extending hopper 27 by raising any desired number of the covers 16. The longitudinally extending rafters 12 will prevent the feed from being discharged into the troughs 11 while the hopper 27 is being filled. The feed in the hopper will be permitted to be discharged gradually through the longitudinally extending slots or gaps 28 into the feeding troughs 11. As has been previously described, the wing nuts 21 and ordinary nuts 24 may be operated for varying the gaps 28. As a hog desires to feed, it will force one of the doors 29 inwardly toward the adjacent feed controlling board 17 for gaining access to the feeding trough 11. The movement of this particular door 29 will cause the same to engage the outer face of the adjacent feed controlling board 17 and will agitate the same for aiding in discharging the feed from the hopper 27 into the trough 11. After the hog has finished eating and withdraws his snout from the trough 11, the door 29 will swing to its closed position and will thereby prevent smaller animals from gaining access to the feed.

It is to be understood that this feeder may be made of any desired length and have as many door openings 8 as required by the respective hog owners. It is very apparent that the feed controlling boards 17 may be cut into sections for permitting each door opening 8 to be provided with an independently operating section and that transverse partitions can then be provided for permitting different kinds of feed to be kept separated in different parts of the feeder. It is well known that a farmer often desires, in addition to the regular feed, to provide charcoal, conditioning powders, tonic foods, etc., for hogs and, of course, such feeds must be kept separate.

It is suggested that a detachable attachment might be provided which may be secured, at will, to one end of the feeder, as illustrated, for handling the special feed above referred to. Such an attachment would merely constitute an extension to the original feeder and be attached thereto, as by suitable clamps or the like, so that the end wall of the original feeder might serve as the back wall of the extension. A swinging door can be provided at the front of the extension, of similar construction to the doors 29, and a similarly constructed mechanism for feeding the specific feed, as described heretofore, may also be employed.

It is, further, to be understood that I do not desire to limit myself to the specific structure illustrated in Figs. 2 and 3 for adjusting the feed controlling boards 17 to vary the gaps 28 for chains may be successfully used in place of the illustrated elements.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. In a device of the kind described, a housing having end walls, and lateral access openings in the side walls and a floor, a partition resting on the floor and extending longitudinally between the end walls to provide feeding troughs, longitudinally extending boards hinged at their upper edges in the upper part of the housing and depending toward the floor in spaced relation to the floor and partition to constitute hopper sides, and means for varying the gap between the lower edges of said boards and the partition for controlling the passage of feed from the hopper to the trough, said means including flexible connections between the partition and the boards, and depending longitudinally adjustable rods carried by the upper portion of said housing and connected to the central portions of said flexible connections for raising and lowering said central portions to move the hinged boards toward and away from said partition.

2. In a device of the kind described, a housing having end walls, and lateral access openings in the side walls and a floor, a partition resting on the floor and extending longitudinally between the end walls to provide feeding troughs, longitudinally extending boards hinged at their upper edges in the upper part of the housing and depending toward the floor in spaced relation to the floor and partition to constitute hopper sides, and means for varying the gap between the lower edges of said boards and the partition for controlling the passage of feed from the hopper to the trough, said means including flexible connections between the partition and the boards, and depending longitudinally adjustable rods carried by the upper portion of said housing and connected to the central portions of said flexible connections for raising and lowering said central portions to move the hinged boards toward and away from said partition, and depending doors covering the access openings and arranged to swing inwardly against the hinged boards to jar the latter.

In testimony whereof I affix my signature.

GEORGE A. KNILANS.